United States Patent [19]

Kawamura et al.

[11] Patent Number: 4,957,666
[45] Date of Patent: Sep. 18, 1990

[54] METHOD OF PRODUCING A SLURRY OF MICROCAPSULES

[75] Inventors: Michio Kawamura; Yasunori Shimada; Koichi Inoshita; Shozo Yoshida; Toshiaki Kawanabe; Haruo Hattori, all of Iyomishima; Yukio Doi, Katashima; Mamoru Awano, Ibaraki, all of Japan

[73] Assignees: Taio Paper Manufacturing Co., Ltd.; Showa High Polymer Co., Ltd., both of Tokyo, Japan

[21] Appl. No.: 243,671

[22] Filed: Sep. 13, 1988

[30] Foreign Application Priority Data

Jan. 29, 1988 [JP] Japan .................. 63-17347

[51] Int. Cl.$^5$ .................. B01J 13/02; B01J 13/18; B41M 5/124
[52] U.S. Cl. .................. 264/4.7; 264/4.3; 428/402.21; 428/914; 503/214; 503/215
[58] Field of Search .................. 264/4.7; 428/402.21

[56] References Cited

U.S. PATENT DOCUMENTS

| | | | |
|---|---|---|---|
| 4,100,103 | 7/1978 | Foris et al. | 264/4.7 X |
| 4,105,823 | 8/1978 | Hasler et al. | 264/4.7 X |
| 4,218,506 | 8/1980 | Oda et al. | 264/4.7 X |
| 4,219,604 | 8/1980 | Kakimi et al. | 264/4.7 X |
| 4,251,386 | 2/1981 | Saeki et al. | 264/4.7 X |
| 4,413,843 | 11/1983 | Iwasaki et al. | 264/4.7 X |
| 4,423,091 | 12/1983 | Iwasaki et al. | 264/4.7 X |
| 4,574,110 | 3/1986 | Asano et al. | 264/4.7 X |
| 4,824,823 | 4/1989 | Pietsch et al. | 264/4.7 X |

OTHER PUBLICATIONS

Asano, Patent Abstracts of Japan, #60-216,838, vol. 10, No. 85 (1985).
Asano et al., Patent Abstracts of Japan, #61-11138, vol. 10, No. 156 (1986).
Kawamura et al., Patent Abstracts of Japan, #61-178035, vol. 10, No. 390 (1986).

*Primary Examiner*—Richard D. Lovering
*Assistant Examiner*—John M. Covert
*Attorney, Agent, or Firm*—Spencer & Frank

[57] ABSTRACT

An improved in-situ polymerization method is provided for easily producing a good slurry of strong, dense, water-resistant and anti-hygroscopic microcapsules made of an amino resin of either of melamine-formaldehyde series or the ureaformaldehyde series, in a high concentration of microcapsules, and a low viscosity.

8 Claims, No Drawings

METHOD OF PRODUCING A SLURRY OF MICROCAPSULES

BACKGROUND OF THE INVENTION

1. Field of the Invention

The present invention relates to a method of producing a slurry of microcapsules, particularly a slurry of microcapsules having wall membranes composed of an amino resin.

2. Related Art Statement

Microcapsules were developed and used originally as materials for non-carbon papers by NCR Corporation in the fist half era of 1950, so that they have a past record of more than 30 years in the technical field. They function to tentatively protect and stabilize the core materials which per se are originally unstable, and discharge the core materials gradually or instantaneously in case of necessity. Recently, techniques for producing microcapsules have advanced remarkably, so that microcapsules (sometimes abbreviated as "capsules", hereinafter) are widely used in various fields such as, medicines, cosmetics, pesticides, perfumes, foods, dyes, etc., in addition to non-carbon papers.

For producing microcapsules, physical methods, mechanical methods, physical chemical methods, and chemical methods, are known and selectively used depending on the use to which the microcapsules will be put.

By using the physical methods or the mechanical methods, microcapsules of large sizes and coarse wall membrane are produced, so that their use is very narrowly restricted.

In contrast, the physical chemical methods and the chemical methods can arbitrarily and easily control the size of the microcapsules down to a small size of a few $\mu m$ with a dense wall membrane, so that such microcapsules are widely used in many use fields.

Among the physical chemical methods, a coacervation method using gelatine as a wall membrane material is known. It is now used most widely, however, it uses a natural product, gelatine, as the wall membrane material, so that it has drawbacks in that the cost is expensive, the microcapsules are suceptible to attacked by microorganisms, have poor resistance to water, microcapsules slurries of high concentrations are difficult to obtain, and the process steps are rather complicated.

The chemical methods include the interfacial polymerization method and the in-situ polymerization method. In the interfacial polymerization method, a hydrophobic monomer and a hydrophilic monomer are copolymerized at an interface between a hydrophobic core material and a water phase to form microcapsules wall membranes of polyamide, epoxy resin, polyurethane, or polyurea, etc. In the in-situ polymerization method, a hydrophobic monomer and a hydrophilic monomer are copolymerized at either of the hydrophobic core materials or the water phase to form wall membranes of amino resin, etc., around the core materials.

As disclosed, for example, in Japanese Laid-open Patent Application Nos. 49-25,822, 52-48,599, 54-91,980, 56-78,182, and 56-88,954etc., the interfacial polymerization method uses a reactive or noxious material, such as isocyanate, acid-chloride, or epoxy compound, etc., as the wall membrane material, so that it has many drawbacks in that the polymerization reaction is hard to control, a material having an active hydrogen can not be used as the core material, and the wall membrane material per se is expensive. In contrast, the in-situ polymerization method can use almost any of synthetic resins, such as acrylate resin, amino resin, polyester resin, and the like, as the wall membrane material for microcapsules, and has advantages that the amino resin is cheap and easily available, the polymerization reaction of the amino resin can be effected in a comparatively short time, and a special catalyst is not necessary for the reaction. Thus, the in-situ polymerization method is easy to perform as compared with the interfacial polymerization method, so that it is a more practical method than the latter, and many inventions regarding the in-situ polymerization method have been developed and filed as patent applications, such as Japanese Patent Nos. 44-3,495, 47-23,165 and 45- 16,949, and Japanese Laid-open Patent Application Nos. 53-84,881 and 54-49,984. However, though the method can provide microcapsules having wall membranes, it has drawbacks in that the wall membranes exhibiting superior water resistance are coarse, emulsification and dispersion of the core material are not sufficiently effected, and further the polycondensation product can hardly be deposited efficiently and stably around the core material.

Methods of producing microcapsules by the in-situ polymerization method wherein a melamineformaldehyde resin or an ureaformaldehyde resin is used as the wall membrane material are already known as described in Japanese Patent Nos. 37-12,380, 44-3,495, and 47-23,165. However, as mentioned above, these methods can hardly deposit the polycondensation product efficiently and stably around the hydrophobic core material, emulsification and dispersion of the core materials are not sufficiently effected.

In order to overcome the aforementioned drawbacks, Japanese Patent No. 54-16,949, and Japanese Laid-open Patent Application Nos. 53-84,881, 53-84,882, and 53-84,883 disclose use of an anionic polyelectrolyte, such as ethylene/maleic anhydride copolymer, methylvinylether/maleic anhydride copolymer, or polyacrylic acid, etc., as a reaction system modifier. According to these methods, the emulsifying and dispersing properties of the hydrophobic core material is improved, strength and density of the wall membranes are enhanced, and a slurry containing strong microcapsules can be obtained in a short period of time. However, the viscosity of the obtained microcapsules slurry is high, and a considerably long time is required for dissolving the particularly effective ethylene/maleic anhydride copolymer, or methylvinylether/maleic anhydride copolymer.

Japanese Laid-open Patent Application Nos. 54-49,984, 55-47,139, and 55-15,660, disclose use of a styrene/maleic anhydride copolymer, or a mixture thereof with vinylacetate/maleic anhydride copolymer or ethylene/maleic anhydride copolymer, as the reaction system modifier. According to these methods, the emulsifying and dispersing property of the core materials are further improved to form a stable and low viscosity slurry containing microcapsules of high strength. However, styrene/maleic anhydride copolymer has drawbacks in that it precipitates at a low pH range so that it can not be used for ureaformaldehyde series wall membrane materials which are in many cases polycondensated condensated at a low pH range, and it can not be used in the process of removing residual formaldehyde for removing unreacted residual formaldehyde at a low pH range.

Japanese Laid-open Patent Application No. 56-51,238 discloses use of styrene sulfonic acid series polymers, such as acrylic acid/styrene sulfonic acid copolymer, polystyrene sulfonic acid, or the like which is an anionic polyelectrolyte, as the reaction system modifier. The styrene sulfonic acid series polymers are stable even at a low pH range, so that the polycondensation reaction in the ureaformaldehyde system or the treatment of removing the residual formaldehyde at a low pH range becomes possible. However, the styrene sulfonic acid series polymers in the melamine/formaldehyde system generates much foam at the time of electrolyzing resulting in troublesome and poor workability, and the styrene sulfonic acid series polymers in the urea/formaldehyde system induces agglomeration of the whole system even with only a small change in the reaction conditions.

The inventors have disclosed previously in Japanese Laid-open Patent Application No. 60-238,140 a novel method of producing microcapsules which uses a copolymer of acrylic acid/acrylamide/acrylonitrile as the reaction system modifier. According to this method, a slurry of microcapsules of good quality can be obtained in a short reaction time by using a ternary copolymer of acrylic acid/acrylamide/acrylonitrile as the modifier.

Nevertheless, recently a slurry of microcapsules of a better quality, a lower viscosity, and a higher microcapsules concentration, has been earnestly desired in accordance with the advanced progress of technology.

SUMMARY OF THE INVENTION

Therefore, it's an object of the present invention to improve the above-described Japanese Laid Open Patent Application No. 60-238,140 to provide a slurry of microcapsules having a better quality, a lower viscosity, and a higher microcapsules concentration.

Another object of the present invention is to provide a method of producing a slurry of microcapsules, which can afford the properties of emulsifying and dispersing well the hydrophobic core material, good stability of the emulsion liquid, simplification and facilitation of the capsulation process steps, a short period of reaction time, microcapsules of exceptionably splendid strength, wall density, water resistance, and antihygroscopic property, and a slurry of microcapsules having a lower viscosity and a higher concentration of microcapsules.

In order to establish such a method, the inventors have made conducted experiments leading to the present invention which achieves the above purpose quite effectively by using a terpolymer of acrylic acid, acrylonitrile, and polyethyleneglycol methacrylate phosphate as the reaction system modifier.

The present invention provides a method of producing a slurry of microcapsules having wall membranes composed of an amino resin, wherein a hydrophobic core material is emulsified and dispersed in an acidic aqueous solution of an anionic polyelectrolyte in water before, during or after addition of an amino compound and an aldehyde, and the amino compound and the aldehyde are polycondensed and deposited as the amino resin around the core material to form the microcapsules in the solution, comprising, using an anionic water-soluble high molecular terpolymer of an acrylic acid/acrylonitrile/polyethyleneglycol methacrylate phosphate as the anionic polyelectrolyte.

The method of the present invention may be practiced as follows.

An acidic aqueous solution of the terpolymer, i.e., ternary copolymer, of acrylic acid/acrylonitrile/polyethyleneglycol methacrylate phosphate in water is prepared. If necessary, the pH of the solution is adjusted to within an acidic range. Into the acidic aqueous solution, a hydrophobic core material to be contained in the microcapsules is emulsified and dispersed. An amino compound which is a material for forming the wall membranes of the microcapsules, is added before, during, or after the emulsification and the dispersion. The amino compound may be added in the form of an initial condensate thereof with an aldehyde to be added next, for example, an aqueous solution of an initial condensate of a melamine resin (commercially available under the tradename of "Mirbane resin SM-800" from Showa Kobunshi K.K.), or an aqueous solution of an initial condensate of a urea resin (commercially available under the trade name of "Thermotite 3HSP from Showa Kobunshi K.K.), etc. If necessary, the pH of the emulsified and dispersed aqueous solution is adjusted. Then, aldehyde is added the solution while agitating (addition of aldehyde may be dispensed with, if the initial condensate of the amino compound is used), the temperature elevated, and held for a time at the elevated temperature to form microcapsules wall membranes in the slurry. If necessary, cooling and/or pH adjustment of the slurry is effected to complete the microencapsulation.

Preferably, the terpolymer of acrylic acid/acrylonitrile/polyethyleneglycol methacrylate phosphate used in the present invention has a viscosity ranging from 50–200,000 cps, particularly from 100–10,000 cps, when expressed as its molecular size by the viscosity of an aqueous solution of the terpolymer in water. The term "viscosity" as used herein means the value of the viscosity, measured on a B-type viscosimeter at 30° C., of the aqueous solution of the anionic terpolymer in water, having usually a non-volatile matter content of 15–25% by weight, and an acidity of pH 1–4. If the viscosity is less than 50 cps, the emulsifying and dispersing power and the core-protecting power during the formation of the microcapsules become insufficient. If the viscosity is larger than 200,000 cps, the handling of the anionic aqueous solution becomes difficult, and the viscosity of the resultant slurry of the microcapsules becomes also undesirably high.

Preferably, the terpolymer has essentially a copolymerization ratio of 65–96 mole%, particularly 77–92 mole%, of an acrylic acid, 3–25 mole%, particularly 7–15 mole%, of acrylonitrile, and 0.5–10 mole%, particularly 1–8 mole%, of polyethyleneglycol (1–5 mole) methacrylate phosphate. If acrylic acid is present as less than 65 mole%, the emulsifying and dispersing power of the anionic terpolymer and the stability of the emulsified particles in the emulsion liquid become insufficient, and if it is larger than 96 mole%, the viscosity of the resultant slurry of the microcapsules becomes untolerably high. If acrylonitrile is less than 3 mole%, the emulsifying and dispersing power of the anionic terpolymer and the stability of the emulsified particles in the emulsion liquid become insufficient, and if it is larger than 25 mole%, the anionic terpolymer becomes insoluble in water. If polyethyleneglycol (1–5 mole) methacrylate phosphate is less than 0.5 mole%, the emulsifying and dispersing power and the dispersing speed of the anionic terpolymer become insufficient or slow, the encapsulation time is prolonged, and the efficiency of forming and depositing the amino resin as a wall membrane of the microcapsule around the core material becomes intolerably bad, and if it is larger than 10 mole%, the reaction system in the capsulation process is liable to become unstable, and agglomeration of the reaction system is likely to occur.

The term "acrylic acid" as used herein has a broad meaning, and includes free acrylic acid, partial salts such as the sodium salt, potassium salt, ammonium salt, etc., of acrylic acid at the carboxylic group of the molecule of the acrylic acid, and mixtures of acrylic acid and the partial salts thereof. Among acrylic acids, acrylic acid is most preferable.

The terpolymer used in the present invention is produced by known methods such as radical polymerization of the three monomers of an, namely acrylic acid, acrylonitrile, polyethyleneglycol methacrylate phosphate in water in the presence of a catalyst such as hydrogen peroxide, potassium persulfate, ammonium persulfate, benzoyl peroxide, cumene peroxide, cyclohexane peroxide, di-t-butyl peroxide, t-butyl hydroperoxide, methylethylketoneperoxide, and azobisisobutylonitrile, etc. If the terpolymer of a high content of acrylonitrile is used, a white acidic aqueous suspension is obtained occasionally, which can be used without hindrance for the encapsulation to obtain the desired effect. The terpolymer can be mixed and dissolved in water in various ratios. The amount of the terpolymer to be used in the hydrophilic medium for the capsulation is generally 1-80 parts by weight relative to 100 parts by weight of the hydrophobic core material, and is properly selected by considering the concentration and the viscosity of the microcapsules slurry, and the particle size of the capsules, etc. If the amount of the terpolymer is small, agglomeration in the reaction system occurs during the encapsulation process, and if the amount of the terpolymer is large, a good slurry of capsules is hard to obtain due to the increase of the viscosity of the resulting slurry of capsules. Thus, the amount of the terpolymer preferably ranges from 3-25 parts by weight relative to 100 parts by weight of the hydrophobic core material.

The term amino resin which forms the capsules wall membrane as used herein means such amino resins as are obtained by, e.g., polycondensating an amino compound selected from the group consisting of urea, methylourea, thiourea, alkylurea, ethyleneurea, melamine, methylol melamine, benzoguanamine, and acetoguanamine, etc., and an aldehyde selected from the group consisting of formaldehyde, acetaldehyde, glutaraldehyde, paraformaldehyde, crotonaldehyde, and benzaldehyde, etc. The amino compound and the aldehyde may be used in the form of respective monomers, or as an initial condensate thereof.

As the hydrophobic core material to be used for the capsulation, use is made of a hydrophobic liquid, for example, animal oils such as fish oil or lard, etc.; vegetable oils such as soybean oil, sesame oil, peanut oil, castor oil or corn oil, etc.; mineral oils such as petroleum oil, kerosene, gasoline, naphtha, paraffine oil, toluene, or xylene, etc.; or synthetic oils such as alkyl-substituted diphenyl alkane, alkyl-substituted naphthalene, diphenylethane, dibutylphthalate, or methylsalicylate, etc. These hydrophobic liquids may then be mixed with medicines, pesticides, cosmetics, perfumes, foods, dyes, or catalysts, etc., depending on the use and the purpose of the microcapsules.

The encapsulation reaction is desirably adjusted to a reaction temperature ranging from 30-100° C., depending on the polycondensation reaction for forming the amino resin.

The reaction temperature preferably ranges from 40-95.° C., particularly from 50-90° C. The reaction time usually ranges from about 0.5-6 hrs., depending on the volume of the reactants,the reaction vessel, and other various factors. The pH of the reaction system is kept acidic, and adjusted preferably to a range of from 1-6.5, particularly from 2-5.5. For holding the pH of the reaction system in the acidic range, an acid catalyst may be used, such as formic acid, acetic acid, citric acid, oxalic acid, hydrochloric acid, phosphoric acid, sulfuric acid, nitric acid, ammonium chloride, or the like acid generally used in producing an amino resin. Instead of an acid catalyst, oxygen in the terpolymer may also be used. For adjusting the pH to a desired value, a base material may be used, such as a hydroxide of an alkaline metal, ammonia water, triethanolamine, or the like. The reaction conditions for the reaction system are determined, and depend on the type of raw materials of the amino resin to be used for the encapsulation and the field of use of the capsules, because the aforementioned conditions of encapsulation, namely, temperature, pH, and temperature-raising rate have quite a large influence on the property of the wall membrane of the thus formed capsules. Preferably, agitation of the reaction system is performed uniformly such that foam is not produced in order to prevent damage of the quality of the resultant capsules.

The reaction system is held for a determined time to complete the encapsulation. Thereafter, if necessary, the system is post treated with, e.g., a pH adjustment by addition of a base material, or removal of the remaining unreacted aldehyde by steam distillation, or addition of a chemical substance, such as sodium sulfite, formamide, hydroxylamine hydrochloride, urea, or ethyleneurea, etc.

The terpolymer according to the present invention is easily produced and is usually in the form of an aqueous solution, so that it does not require a long time for its dissolution contrary to conventional ethylene/maleic anhydride copolymers or methylvinylether/maleic anhydride copolymers, and it does not produce foam but exhibits a splendid workability contrary to styrene sulfonic acid series polymers. The terpolymer is stable and does not form precipitates at a low pH range unlike styrene/maleic anhydride copolymers, so that the terpolymer can be used for producing microcapsules using ureaformaldehyde resin as the wall membrane which hitherto was not possible using a styrene/maleic anhydride copolymer, and removal of the residual formaldehyde at a low pH range can also be performed effectively if the terpolymer is used. A detailed reason why such splendid effects are achieved is not clear. But, it is presumed that the terpolymer per se has a high emulsifying and dispersing power, functions as a good protective colloid, and functions well to efficiently from and deposit the polycondensation product of the amino compound around the core material.

DESCRIPTION OF THE PREFERRED EMBODIMENTS

Hereinafter, the present invention will be explained in more detail with reference to examples of use in noncarbon paper, which is the widest use of microcapsules, and which, however, should not be construed by any means as a limitations of the present invention. For example, microcapsules for other uses can also be produced. In the examples, all parts and %s are on a by weight basis, unless other specified. For adjusting the pH of the reaction system, 10% sodium hydroxide aqueous solution and 10% hydrochloric acid solution are used in the examples, which, however, do not restrict the present invention thereto.

EXAMPLE 1

An aqueous solution of the anionic terpolymer is prepared by the following procedures.

608 parts of water is charged in a four-necked flask equipped with an agitator, a thermometer, and a reflux condenser, and elevated to 80°C. The flask is added with a ¼ amount of a homogeneous aqueous monomers solution of 240 parts of a 80% acrylic acid aqueous solution, 24 parts of acrylonitrile, and 24 parts of polyethyleneglycol (4 mol) methacrylate phosphate in 256 parts of water, and further added with 32 parts of a 1% potassium persulfate aqueous solution. At the time when the elevated temperature in the flask reached to 88°C., the remainder (¾ of the total amount) of the above aqueous monomers solution is added dropwise continuously to the flask over 1.5 hrs. At the time of completion of the addition, and at 30 min. and 1 hr. after the completion, each 8 parts, summing up to 24 parts of a 1% potassium persulfate aqueous solution is added to the flask. The above procedure is effected at a flask inner temperature of 95–98° C. in a nitrogen stream. Then, the flask is cooled. A terpolymer of acrylic acid/acrylonitrile/polyethyleneglycol (4 mol) methacrylate phosphate is obtained. Analytical values of the terpolymers are a non-volatile matter content of 21.7%, a pH of 2.10, and a viscosity of 558 cps (30° C., B type viscosimeter).

50 parts of the aqueous solution of the watersoluble high molecular terpolymer made of 80 parts of acrylic acid, 10 parts of acrylonitrile, and 10 parts of polyethyleneglycol (4 mol) methacrylate phosphate obtained in the above way and having a non-volatile matter content of 21.7% and a copolymerization ratio of the three monomers in mol% of 83.6/14.2/2.2, is added to 50 parts of water under agitation, and adjusted to pH 4.5 to obtain a hydrophilic medium for the capsulation. Meanwhile, 10 parts of melamine, and 25 parts of 37% formalin, are added to 65 parts of water, adjusted to pH 9 under agitation, and heated to 60° C. for about 20 min. to obtain a transparent initial condensate of melamineformaldehyde. Separately, 4 parts of crystal-violetlactone (CVL), and 2 parts of benzoylleucomethylene blue (BLMB), are added to 100 parts of alkyldiphenylethane (produced and sold by Nippon Sekiyu Kagaku K.K. under the trade name of Hisol SAS-296), heated and melted at 90° C. for 20 min. under agitation, and cooled to ambient temperature to obtain a hydrophobic core material. 100 parts of the core material and 100 parts of the above mentioned hydrophobic medium are mixed at 40° C., and emulsified on a homomixer (produced by Tokushu Kika Kogyo K.K.) at 9,000 rpm for 4 min. to obtain an O/W type emulsion liquid containing particles of an average particle diameter of 4.0 μ. 100 parts of the above obtained initial condensate of melamineformaldehyde is adjusted to pH 4.5, heated to 40° C., then added to the above emulsion liquid, and elevated to 60° C. while agitating. After held at 60° C. for 2 hrs., the system is cooled to 25° C., and adjusted to pH 8.5 to obtain a good capsules slurry containing capsules particles of an average particle diameter of 4.0 μ and having a viscosity of 180 cps at 30° C. measured on B type viscosimeter. During the processes of preparing the hydrophilic medium and forming the capsules, no special foam is seen, and the workability is good.

EXAMPLE 2

A microcapsules slurry is produced by the capsulation reaction in the same way as in Example 1, except that an aqueous solution of a commercial initial condensate of melamineformaldehyde sold under the trade name of "Mirbaneresin SM-800" by Showa Kobunshi K.K. is used as the initial condensate of melamine-formaldehyde. Thus, a capsules slurry is obtained containing the microcapsules of an average particle diameter of 3.8 μ, and having a viscosity of 170 cps (30° C., B type viscosimeter) and good properties.

EXAMPLE 3

A microcapsules slurry is produced by the capsulation reaction in the same way as in Example 1, except that an aqueous solution of a water-soluble high molecular terpolymer of 85 parts of acrylic acid, 5 parts of acrylonitrile, and 10 parts of polyethyleneglycol (4 mol) methacrylate phosphate prepared in the same way as in Example 1, having a non-volatile matter content of 22.9%, a viscosity of 445 cps (30° C., B type viscosimeter), a pH of 2.5, and a copolymerization ratio of the three monomers in mol% of 90.5/7.2/2.3, is used as the anionic aqueous solution, and an aqueous solution of a commercial initial condensate Mirbaneresin SM-800 is used as the initial condensate of melamineformaldehyde. Thus, a capsules slurry is obtained containing microcapsules of an average particle diameter of 4.1 μ, and having a viscosity of 125 cps (30° C., B type viscosimeter) and good properties.

EXAMPLE 4

A microcapsules slurry is produced by the capsulation reaction in the same way as in Example 1, except that an aqueous solution of a water-soluble high molecular terpolymer of 85 parts of acrylic acid, 10 parts of acrylonitrile, and 5 parts of polyethyleneglycol (4 mol) methacrylate phosphate prepared in the same way as in Example 1, having a non-volatile matter content of 23.2%, a viscosity of 837 cps (30° C., B type viscosimeter), a pH of 2.10, and a copolymerization ratio of the three monomers in mol% of 85.3/13.6/1.1, is used as the anionic aqueous solution, and an aqueous solution of a commercial initial condensate of melamineformaldehyde Mirbaneresin SM-800 is used as the initial condensate of melamineformaldehyde. Thus, a capsules slurry is obtained containing microcapsules of an average particle diameter of 4.2 μ, and having a viscosity of 190 cps (30° C., B type viscosimeter) and good properties.

EXAMPLE 5

A microcapsules slurry is produced by the capsulation reaction in the same way as in Example 1, except that an aqueous solution of a water-soluble high molecular terpolymer of 90 parts of acrylic acid, 5 parts of acrylonitrile, and 5 parts of polyethyleneglycol (4 mol) methacrylate phosphate prepared in the same way as in Example 1, having a non-volatile matter content of 22.4%, a viscosity of 300 cps (30° C., B type viscosimeter), a pH of 2.08, and a copolymerization ratio of the three monomers in mol% of 92.0/6.9/1.1, is used as the anionic aqueous solution, and an aqueous solution of a commercial initial condensate of melamineformaldehyde Mirbaneresin SM-800 is used as the initial condensate of melamineformaldehyde. Thus, a capsules slurry is obtained containing microcapsules of an average particle diameter of 3.9 μ and having a viscosity of 220 cps (30° C., B type viscosimeter) and good properties.

EXAMPLE 6

A microcapsules slurry is produced by the capsulation reaction in the same way as in Example 1, except that an aqueous solution of a water-soluble high molecular terpolymer of 70 parts of acrylic acid, 10 parts of acrylonitrile, and 20 parts of polyethyleneglycol (4 mol) methacrylate phosphate prepared in the same way as in Example 1, having a nonvolatile matter content of 22.7%, a viscosity of 644 cps (30° C., B type viscosimeter), a pH of 2.05, and a copolymerization ratio of the three monomers in mol% of 79.9/15.5/4.8, is used as the anionic aqueous solution, and an aqueous solution of a commercial initial condensate of melamineformaldehyde Mirbaneresin SM-800 is used as the initial condensate of melamineformaldehyde. Thus, a capsules slurry is obtained containing microcapsules of an average particle diameter of 4.2 μ and having a viscosity of 140 cps (30° C., B type viscosimeter) and good properties.

EXAMPLE 7

50 parts of an aqueous solution of a watersoluble high molecular terpolymer of acrylic acid/acrylonitrile/polyethyleneglycol (4 mol) methacrylate phosphate having a non-volatile matter content of 21.7% prepared in the same manner as in Example 1, is added to 50 parts of water under agitation. Further, 10 parts of urea and 1.4 parts of resorcin are added to the solution and dissolved therein. The aqueous solution of the water-soluble high molecular terpolymer containing urea and resorcin is adjusted to pH 3.5 to obtain a hydrophilic medium for the capsulation. Separately, 4 parts of CVL and 2 parts of BLMB are added to 100 parts of alkyldiphenylethane Hisol SAS-296, heated and melted at 90° C. for 20 min. under agitation, and cooled to ambient temperature to obtain a hydrophobic core material. 100 parts of the core material and 100 parts of the above prepared hydrophilic medium are mixed at 45° C., and emulsified and dispersed on a homomixer (made by Tokushu Kika Kogyo K.K.) at 9,000 rpm for 4 min. to obtain an O/W type emulsion liquid containing particles of an average diameter of 4.1 μ. The emulsion liquid is added with 27 parts of 37% formalin, elevated to a temperature of 60° C. while agitating, and held at 60° C. for 2 hrs. to form the microcapsules. Thereafter, the reaction system is cooled to 20° C., adjusted to pH 8.5 to complete the production of a capsules slurry. Thus, a capsules slurry is obtained containing capsules of an average particle diameter of 4.1 μ, and having a viscosity of 210 cps (30° C., B type viscosimeter) and good properties.

EXAMPLE 8

A microcapsules slurry is produced by the capsulation reaction in the same way as in Example 7, except that an aqueous solution of a commercial initial condensate of ureaformaldehyde produced and sold under the trade name of Thermotite 3HSP by Showa Kobunshi K.K. Thus, a capsules slurry is obtained containing capsules of an average particle diameter of 3.9 μ, and having a viscosity of 95 cps (30° C., B type viscosimeter) and good properties.

COMPARATIVE EXAMPLE 1

A microcapsules slurry is produced by the capsulation reaction in the same way as in Example 1, except that an aqueous solution of a water-soluble high molecular terpolymer of 50 parts of acrylic acid, 40 parts of acrylamide, and 10 parts of acrylonitrile and prepared in the same way as in Example 1, having a nonvolatile matter content of 20.9%, a pH of 3.65, a viscosity of 820 cps (30° C., B type viscosimeter), and a copolymerization ratio of the three monomers in mol% of 48.0/38.9/18.1, is used as the anionic terpolymer, and an aqueous solution of a commercial initial condensate of melamineformaldehyde Mirbaneresin SM-800 is used as the aqueous solution of initial condensate of melamineformaldehyde. Thus obtained slurry contains capsules of an average particle diameter of 4.1 μ, and has a viscosity of 430 cps (30° C., B type viscosimeter).

COMPARATIVE EXAMPLE 2

In an effort of producing a microcapsules slurry, the method of Example 1 is repeated, except that an aqueous solution of a water-soluble high molecular copolymer of 90 parts of acrylic acid, and 10 parts of acrylonitrile and prepared in the same way as in Example 1, having a non-volatile matter content of 19.3%, a pH of 2.35, a viscosity of 900 cps (30° C., B type viscosimeter), and a copolymerization ratio of the two components in mol% of 86.9/13.1, is used as the anionic copolymer, and an aqueous solution of a commercial initial condensate Mirbaneresin SM-800 is used as the aqueous solution of initial condensate of melamineformaldehyde. However, the hydrophobic core material is unable to emulsify, so that a capsules slurry is not produced.

COMPARATIVE EXAMPLE 3

In an effort of producing a microcapsules slurry, the method of Example 1 is repeated, except that an aqueous solution of a water-soluble high molecular acrylic acid homopolymer prepared in the same way as in Example 1, having a non-volatile matter content of 22.3%, a pH of 1.80, a viscosity of 760 cps (30° C., B type viscosimeter), is used as the anionic polymer, and an aqueous solution of a commercial initial condensate Mirbaneresin SM-800 is used as the aqueous solution of initial condensate of melamineformaldehyde. However, during the reaction, the whole system is agglomerated, so that a capsules slurry is not obtained.

COMPARATIVE EXAMPLE 4

A microcapsules slurry is produced by the capsules-forming reaction in the same way as in Example 1, except that an aqueous solution of 20 parts of an ethylene/maleic anhydride copolymer (produced and sold under the trade name of EMA31 by Monsanto Co.) in 80 parts of water, having a non-volatile matter content of 20%, is used as the aqueous solution of the anionic polyelectrolyte, and an aqueous solution of a commercial initial condensate Mirbaneresin SM-800 is used as the aqueous solution of initial condensate of melamineformaldehyde. However, thus obtained slurry contains capsules of an average particle diameter of 5.3 μ, and has a high viscosity of 2,000 cps (30° C., B type viscosimeter). In addition, a prolonged time of 3 hrs. at 80° C. is required for dissolving the ethylene/maleic anhydride copolymer.

COMPARATIVE EXAMPLE 5

A microcapsules slurry is produced by the capsulation reaction in the same way as in Example 1, except that an aqueous solution of 20 parts of a partial sodium salt of polystyrenesulfonic acid produced and sold under the trade name of VERSA TL500 by National Starch Co. in 80 parts of water, having a non-volatile matter content of 20%, is used as the aqueous solution of the anionic polyelectrolyte, and an aqueous solution of a commercial initial condensate Mirbaneresin SM-800 is used as the aqueous solution of initial condensate of melamineformaldehyde. Thus, obtained slurry contains capsules of an average particle diameter of 5.4 $\mu$, and has a high viscosity of 2,500 cps (30° C., B type viscosimeter). In addition, a number of foams are seen when dissolving the partial sodium salt of polystyrenesulfonic acid, so that the anionic aqueous electrolyte solution has to be left for about 1 hr. for vanishing the foams prior to the use of the solution for the capsulation reaction.

COMPARATIVE EXAMPLE 6

In an effort of obtaining a microcapsules slurry, the method of Example 7 is repeated, except that an aqueous solution of 20 parts of VERSA TL500 in 80 parts of water and having a non-volatile matter content of 20% is used as the anionic polyelectrolyte solution. However, during the reaction, the reaction system is agglomerated, so that capsules are not obtained.

The capsules slurry obtained by the Examples and the Comparative Examples are evaluated for their properties on the following items.

(1) Average particle diameter:

Particle diameters distribution is measured on TA-II type particle size measuring device sold from Coulter Electronics Co., and a particle diameter corresponding to 50% by volume of the capsules is expressed as an average particle diameter. The smaller the average particle diameter is, the stronger the emulsifying power of the anionic terpolymer or electrolyte is.

(2) Viscosity:

Viscosity of capsules slurry is measured at 30° C. on a B type viscosimeter at 60 rpm.

(3) The term "capsulation degree" hereby means an evaluation of an extent of development of color of a lower sheet of a non-carbon paper (coated with a developer) prepared by coating and drying a capsules slurry on a paper. For that purpose, 50 parts of a capsules slurry is added and mixed with 50 parts of water, and the mixture is applied on a commercial noncarbon paper (produced and sold by Taio Seishi K.K. under the trade name of Microchemical paper NW40C) at a dried amount of 4 g/m$^2$, and dried. The color of the coated surface is compared. If the coated surface is completely white (capsulation degree is good), this means a complete capsulation of the core materials. If the coated surface is blue (capsulation degree is bad), this means existences of unsufficiently emulsified and dispersed core materials and uncapsulated remaining core materials. That is, capsulation degree is a measure of judging an emulsifying and dispersing power of the modifier.

(4) Color developing property:

50 parts of a capsules slurry is added with parts of water, and further with 5 parts of cellulose powder and 10 parts of 10% oxidized starch aqueous solution, and mixed and dispersed to prepare a capsules coloring matter. The capsules coloring matter is applied on a raw paper of a unit weight of 40 g/m$^2$ at a dried coating amount of 4 g/m$^2$ by means of a wire bar, and dried to prepare an upper sheet of a non-carbon paper. The upper sheet is superposed on the abovedescribed coated lower sheet (Microchemical paper NW40C), and printed by a typewriter, for evaluation of the color developing property.

(5) Pressure smudge:

An upper sheet of a non-carbon paper is prepared in the same way as in the color developing test of the item (4), superposed on a commercial lower sheet (Microchemical paper NW40C), exerted by a static pressure of about 1.5 kg/cm$^2$, in order to compare a pressure smudge of the coated surface of the lower sheet. Pressure smudge is naturally large if the strength of the capsules wall membrane is weak, or if the particle size distribution of capsules is bad including coarse particles.

(6) Antihygroscopic property:

An upper sheet of a non-carbon paper is prepared in the same way as in the color developing test, left in an isothermal isohygroscopic state of 40° C. and a relative humidity of 90% for 1 week, superposed on a commercial lower sheet (Microchemical paper NW40C) of a non-carbon paper, and printed by a typewriter. The printed lower sheet is compared with the printed lower sheet obtained at the color developing property test of the above item (4). If the antihygroscopic property is bad, then color development of the printed lower sheet is inferior to the color development of the printed lower sheet obtained by the color developing property test of the above item (4), and the difference between the two is large. While, if the antihygroscopic property is good, then the difference is small or nearly zero, showing the capsules are good.

The results of the above evaluation tests are summarized in the following Table 1.

TABLE 1

|  | Average capsule diameter ($\mu$) | Slurry viscosity (cps) | Slurry concentration (%) | Capsulation degree | Color developing property | Pressure smudge | Antihygroscopic property |
|---|---|---|---|---|---|---|---|
| Example 1 | 4.0 | 180 | 43.4 |  |  |  |  |
| Example 2 | 3.8 | 170 | 42.5 |  |  |  |  |
| Example 3 | 4.1 | 125 | 40.7 |  |  |  |  |
| Example 4 | 4.2 | 190 | 42.1 |  |  |  |  |
| Example 5 | 3.9 | 220 | 43.0 |  |  |  |  |
| Example 6 | 4.2 | 140 | 42.3 |  |  |  |  |
| Example 7 | 4.1 | 210 | 40.2 |  |  |  |  |
| Example 8 | 3.9 | 95 | 41.4 |  |  |  |  |
| Reference Example 1 | 4.1 | 430 | 43.2 |  |  |  |  |
| Reference Example 2 | — | — | — | — | — | — | — |
| Reference | — | — | — | — | — | — | — |

TABLE 1-continued

|  | Average capsule diameter (μ) | Slurry viscosity (cps) | Slurry concentration (%) | Capsulation degree | Color developing property | Pressure smudge | Anti-hygroscopic property |
|---|---|---|---|---|---|---|---|
| Example 3 |  |  |  |  |  |  |  |
| Reference Example 4 | 5.3 | 2000 | 42.4 | Δ |  |  | Δ |
| Reference Example 5 | 5.4 | 2500 | 43.2 | Δ |  | Δ | Δ |
| Reference Example 6 | — | — | — | — | — | — | — |

Note:
Evaluation standard in the Table 1 is as follows.
... excellent,
... good,
Δ ... bad As seen from the above Table 1, all the capsules slurries according to the present invention are of splendid quality in that they have small average capsules diameters of 3.8–4.2 μ, low slurry viscosities of 220–440 cps, excellent capsulation degrees, a good color developing property, a good antihygroscopic property, and few pressure smudge. To the contrary, the capsules slurries of the Comparative Examples are not of good quality in that they have large average capsules diameters of 4.7 μ or more except Comparative Example 1, high viscosities, inferior antihygroscopic property, and many pressure smudges. Also, in Comparative Examples 2, 3 and 6, microcapsules can not be produced, because the whole system is agglomerated or the hydrophobic core material is not emulsified, during the capsulation process. Also, Comparative Example 1 corresponding to an embodiment of the applicant's method of Japanese Patent Application Laid-open No. 60-238,140 shows a much higher slurry viscosity of 430 cps. Thus, it is clear that the method of the present invention can produce an excellent microcapsules slurry having splendid properties on the entire test items.

As explained in detail in the foregoing descriptions, the method of the present invention can produce, in entire case of using a melamineformaldehyde series resin or a ureaformaldehyde series resin as the wall membrane material, a stable emulsion liquid of small uniform particles of a hydrophobic core material, a highly dense capsules wall membrane, efficiently in a short period of time, and a capsules slurry of a low viscosity, a high concentration, and good properties. Therefore, the method of the present invention improves the applicant's prior method of Japanese Patent Application Laid-open No. 60-238,140, and contributes in great deal to the development of the industry.

Although the present invention has been explained with specific examples and numerical values, it is of course apparent to those skilled in the art that various changes and modifications thereof are possible without departing the broad spirit and aspect of the present invention as defined in the appended claims.

What is claimed is:

1. A method of producing a slurry of microcapsules having wall membranes comprised of an amino resin, the method comprising:
    (a) providing an acidic aqueous solution comprised of water and an anionic polyelectrolyte which is an anionic terpolymer of acrylic acid, acrylonitrile, and polyethyleneglycol methacrylate phosphate, and which is water soluble and has a high molecular weight;
    (b) mixing an amino compound and an aldehyde into the acidic aqueous solution in quantities sufficient to undergo polycondensation and provide an amino resin;
    (c) adding a hydrophobic core material into the acidic aqueous solution before, during or after step (b) to emulsify and disperse the hydrophobic core material therein; and
    (d) encapsulating the hydrophobic core material to form a slurry of microcapsules by polycondensing the amino compound and the aldehyde into an amino resin and depositing the amino resin around the hydrophobic core material to form the slurry of microcapsules.

2. The method as defined in claim 1, wherein the amino resin is a melamineformaldehyde resin.

3. The method as defined in claim 1, wherein the amino resin is a ureaformaldehyde resin.

4. The method as defined in claim 1, wherein the anionic terpolymer is a polymer consisting essentially of from 65–96 mole % of an acrylic acid, from 3–25 mole % of acrylonitrile, and from 0.5–10 mole % of polyethyleneglycol (1–5 mol) methacrylate phosphate.

5. The method as defined in claim 1, wherein from 1–30 parts by weight of the anionic terpolymer is provided relative to 100 parts by weight of the hydrophobic core material.

6. The method as defined in claim 1, wherein the acidic aqueous solution of the anionic terpolymer has a viscosity ranging from 50–200,000 cps.

7. The method as defined in claim 6, wherein the acidic aqueous solution of the anionic terpolymer has a viscosity ranging from 100–10,000 cps.

8. The process of modifying a reaction system for producing a slurry of microcapsules by in situ polycondensation of an amino compound and an aldehyde to form an amino resin with deposition of the amino resin around a hydrophobic core material which has been emulsified and dispersed in an acidic aqueous solution of an anionic terpolymer of an acrylic acid, acrylonitrile, and polyethyleneglycol methacrylate phosphate, which anionic terpolymer is water soluble and has a high molecular weight.

* * * * *